Sept. 22, 1925.
A. W. AYLING
TOILET FLOAT
Filed Dec. 16, 1921
1,554,775
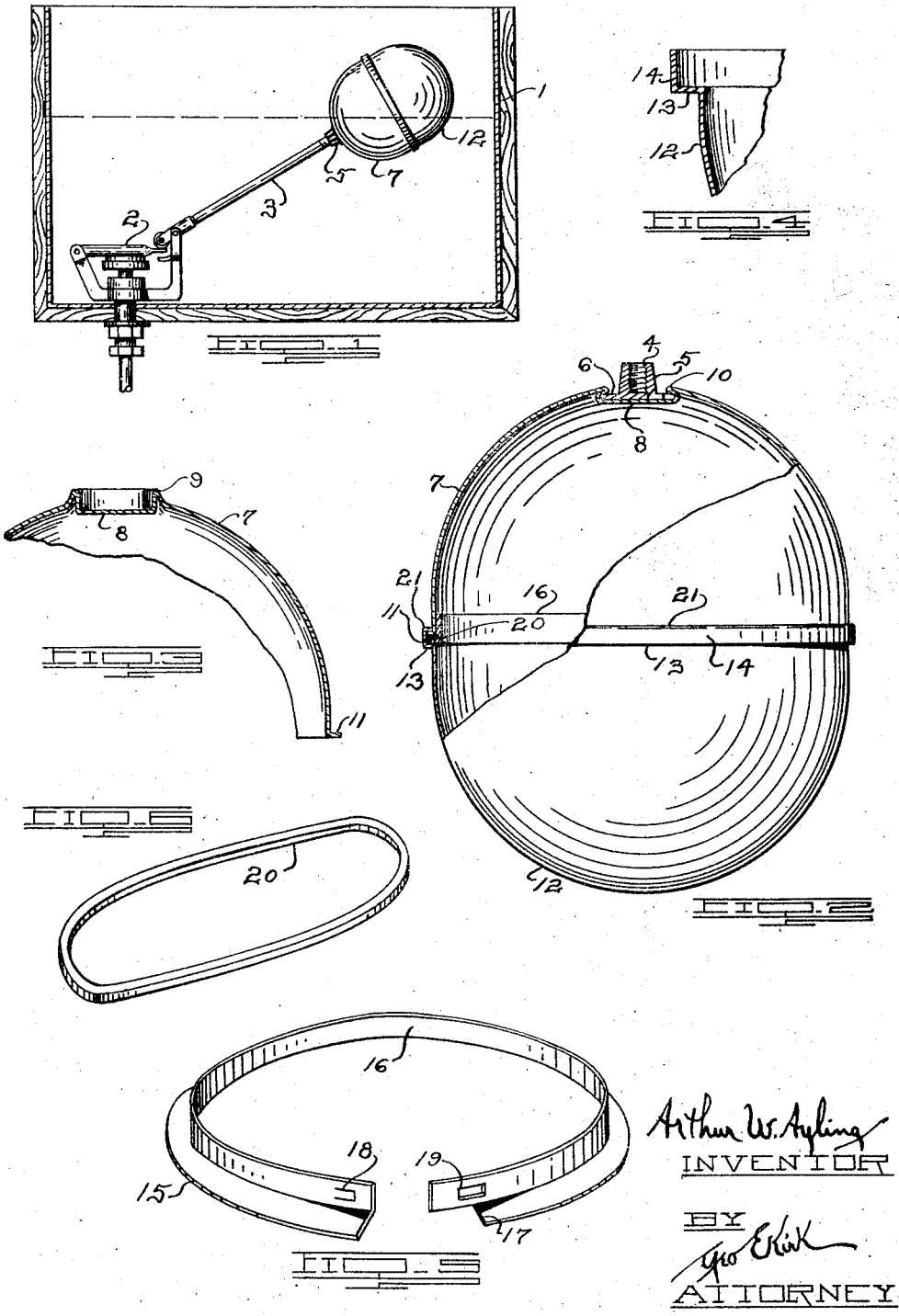

Patented Sept. 22, 1925.

1,554,775

UNITED STATES PATENT OFFICE.

ARTHUR W. AYLING, OF TOLEDO, OHIO.

TOILET FLOAT.

Application filed December 16, 1921. Serial No. 522,893.

*To all whom it may concern:*

Be it known that I, ARTHUR W. AYLING, a citizen of the United States of America, residing at Toledo, Lucas County, Ohio, have invented new and useful Toilet Floats, of which the following is a specification.

This invention relates to sealed hollow members.

This invention has utility when incorporated in hollow float sections especially for toilet flush tanks.

Referring to the drawings:

Fig. 1 is a section through a toilet flush tank showing an embodiment of the float incorporated therewith;

Fig. 2 is a side elevation on an enlarged scale, of the float of Fig. 1, portions being broken away;

Fig. 3 is an enlarged fragmentary view of the spud seat portion of the mounting section of the float;

Fig. 4 is a fragmentary section of the outer or closure section of the float at the joint, before the joint is formed;

Fig. 5 is a perspective view of the gasket seat ring or gasket holder; and

Fig. 6 is a perspective view of the gasket.

Toilet flush tank 1 is shown as having supply valve 2 therein, held closed by the action of float stem 3 being lifted by the float. This stem 3 has its free or outer end threaded to enter threaded stem 4 of spud 5 having flat base flange 6.

Hollow float section 7 is shown as having seat 8 surrounded by flange 9 pressed down over the flange 6 of the spud 5 to anchor this spud 5 in assembly with the said float section 7, the flange engaging the entire surface of the seat. There is accordingly provided an imperforate section of the float section 7 effecting a complete assembly with the mounting for the float stem 3. Float section 7 is shown as of hemispherical form and remote from the seat 8 is shown as terminating in an endless annular straight flange 11.

The float proper is shown as built up of this mounting section 7 and a similar hemispherical section 12. This section 12 is shown as having opposite the flange 11 of the section 7 a flange 13 bent to have an additional flange section 14, endless as to the section 12.

In the disclosure herein, there is provided a full or complete channel as to the section 12. This is accomplished by additional seat forming member herein shown as split ring 15, having upstanding flange 16.

This ring 15, 16, is rolled from strip stock and is shown near one terminal as provided with a cut-out portion 17 so that the ends of the ring portion 15 which seats against the flange 13 may not overlap. The ring is completed by tongue 18 entering recess 19. The ring, as thus completed and in position on the seat 13 of the member 12 may have disposed in a channel between the flanges 16, 14, a gasket 20, say of rubber or other compressible sealing material. In practice, with the parts thus assembled, the section 12 may have the section 7 with its flange 11 seated upon this gasket 20, and then the doubly bent flange 13, 14, have its terminus bent as interconnecting portion 21 in effecting complete joint assembly and sealing of the sections 7, 12, thereby hermetically sealing the hollow sections as a float.

In practice, these sections 7, 12, may, if desirable, be of a very light weight copper forming a sheet metal light weight float. There is accordingly no leakage at the joint between the hollow sections or opening into the interior of the hollow float which is now fully copper armored throughout. The extra ring 15, 16, is not only a reinforcement of the joint for holding the sections in circular form but is the channel completing member, thereby making possible a most rapid assembly of the gasket therewith, in high speed production of these floats, and thereby very materially reduces the cost. Further, with this gasket 20 of this float held in anchored position against disturbance, there is practically eliminated any leakage trouble from improper joint as manufactured in this float. This anchoring, besides holding the spud 5, also keeps the spud keyed against rotation as to the mounting section. This keying is conveniently effected by configuring the spud flange 6 so as to have it of polygonal form, and the crowding down of the rim 9 will effect both anchored and keyed assembly.

What is claimed and it is desired to secure by Letters Patent is:

1. A hollow float embodying a mounting section, and a closure section, one having a bent flange and the other having a straight flange, a ring seated against one flange to form a channel, and a gasket in said channel, one of said section flanges being foldable over the gasket in the channel and the other section flange to effect a sealed joint assembly of the sections.

2. A hollow float embodying a mounting section, and a closure section, one having a bent flange and the other having a straight flange, a ring L-shaped in cross section seated on the bent flange therewith to form a channel, and a gasket in said channel, said bent flange being foldable over the other flange to effect a sealed joint assembly of the sections.

3. A hollow float of sheet metal having a ring shaped wall about a float stem seat, a mounting spud for the float stem having a flat flanged portion abutting said seat and engaging the entire surface thereof within said wall, said wall overhanging said flange in providing an endless locking groove for the spud to said float.

In witness whereof I affix my signature.

ARTHUR W. AYLING.